United States Patent [19]

Yau

[11] Patent Number: 4,617,871
[45] Date of Patent: Oct. 21, 1986

[54] STEERABLE WIND-POWERED VEHICLE

[76] Inventor: Chi L. Yau, 64 Main Street, Frodsham, Cheshire, England

[21] Appl. No.: 774,876

[22] Filed: Sep. 12, 1985

Related U.S. Application Data

[63] Continuation of Ser. No. 587,561, Mar. 8, 1984, abandoned.

[30] Foreign Application Priority Data

Mar. 8, 1983 [GB] United Kingdom ............... 8306282

[51] Int. Cl.$^4$ .............................................. B63H 9/00
[52] U.S. Cl. ........................................ 114/39; 114/43; 114/91; 114/281; 280/1.11 A; 280/810
[58] Field of Search ...................... 441/74; 114/39, 91, 114/43, 281; 267/69; 280/1, 1.11 A, 810, 11.1 BT, 87.1, 771, 92; 74/25, 26

[56] References Cited

U.S. PATENT DOCUMENTS

| 457,323 | 8/1891 | Matthews | 114/91 |
|---|---|---|---|
| 2,991,524 | 7/1961 | Dobrikin | 267/69 X |
| 3,276,050 | 10/1966 | Edwards | 441/74 |
| 3,409,920 | 11/1968 | Brownley | 441/74 |
| 3,968,765 | 7/1976 | Menegus | 114/102 |
| 4,385,579 | 5/1983 | Baulard-Caugan | 114/91 |
| 4,445,699 | 5/1984 | Darasko | 280/92 X |

FOREIGN PATENT DOCUMENTS

| 889857 | 1/1981 | Belgium . | |
| 0060043 | 9/1982 | European Pat. Off. . | |
| 0070673 | 1/1983 | European Pat. Off. . | |
| 649117 | 12/1928 | France | 280/1 |
| 959743 | 4/1950 | France | 280/11.1 BT |
| 2430327 | 1/1980 | France . | |
| 1401095 | 7/1975 | United Kingdom . | |
| 1581626 | 12/1980 | United Kingdom . | |
| 2101947 | 1/1983 | United Kingdom . | |

Primary Examiner—Sherman D. Basinger
Attorney, Agent, or Firm—Staas & Halsey

[57] ABSTRACT

The present invention concerns a steerable wind-powered vehicle, which comprises a base supported on at least two wheels, skis, skates or hydrofoils, at least one of the wheels, skis, skates or hydrofoils being arranged to be steerable, a mast carrying a sail and being pivotally and rotatably mounted with respect to the base, and a mechanism responsive to pivotal movement of the mast for controlling directional movement of the or each of the steerable wheels, skis, skates or hydrofoils.

22 Claims, 9 Drawing Figures

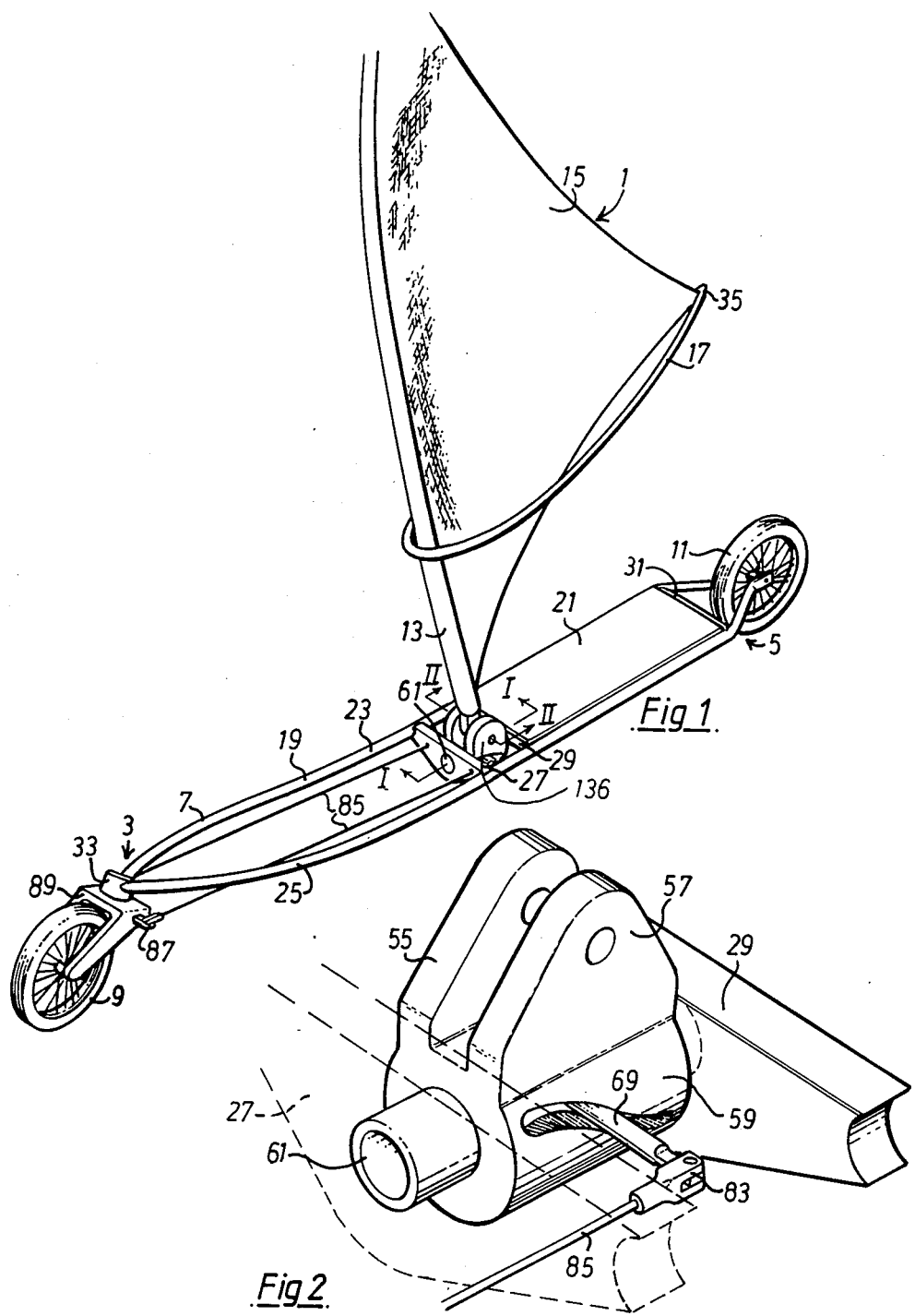

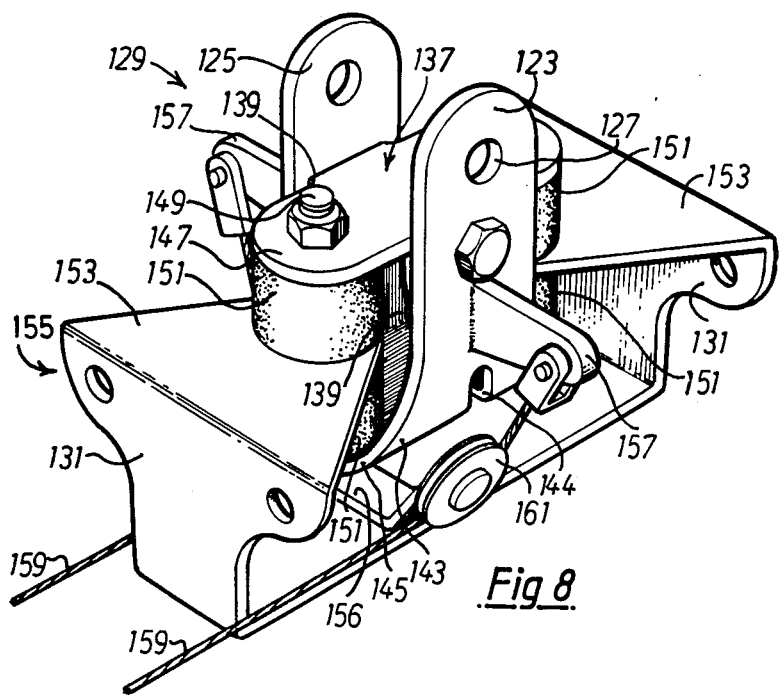
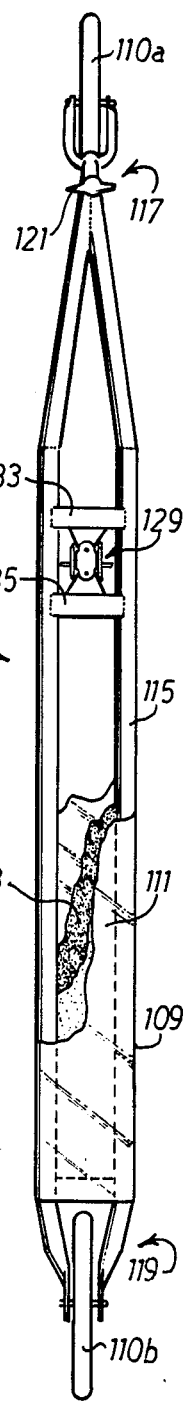
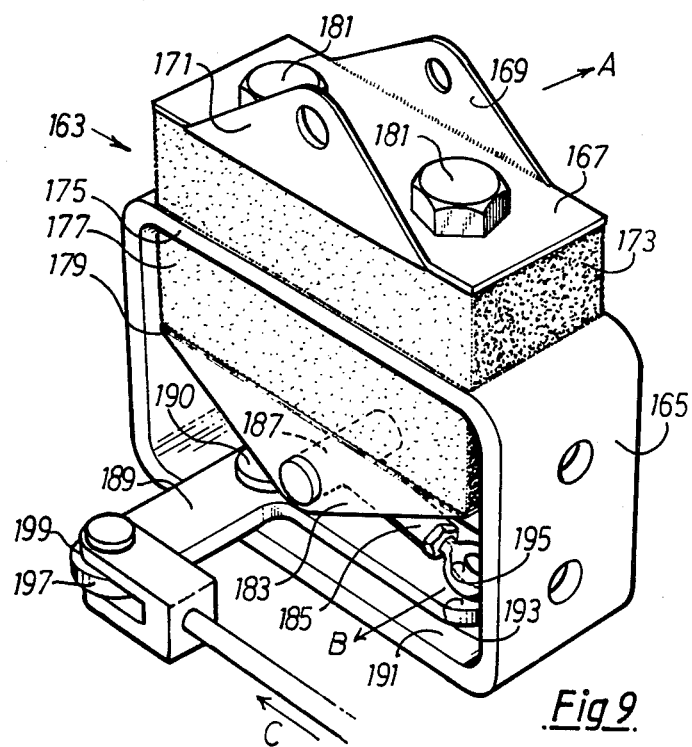
Fig. 7
Fig. 8
Fig. 9

STEERABLE WIND-POWERED VEHICLE

This is a continuation of co-pending application Ser. No. 587,561 filed on Mar. 8, 1984, and now abandoned.

DESCRIPTION

The present invention relates to steerable wind-powered vehicles. More particularly the present invention relates to steerable wind-powered vehicles or yachts for use on land or water which are supported on wheels, skis, skates or hydrofoils, with at least one of the wheels, skis, skates or hydrofoils being steerable.

According to the present invention there is provided a steerable wind-powered vehicle, which comprises a base supported on two or more wheels, skis, skates or hydrofoils, one or more of said wheels, skis, skates or hydrofoils being arranged to be steerable, a mast carrying a sail and being pivotally and rotatably mounted with respect to said base, and a mechanism responsive to pivotal movement of said mast for controlling directional movement of the or each of said steerable wheels, skis, skates or hydrofoils.

The base of the vehicle according to the present invention is preferably buoyant and may, for example, comprise a rigid frame having a platform fixedly secured thereto. The frame may, for example, be made of metal, e.g. aluminium or steel, or wood. If the frame is made of metal, it preferably comprises tubular metal members, e.g. tubular aluminium members or tubular steel members, since the use of such tubular members gives to the frame the combined advantages of rigidity and lightness in weight. The platform may, for example, be made of wood, metal, e.g. aluminium or steel, or a plastics material. The platform may, for example, be fixedly secured directly to the frame or be fixedly secured to the frame by means of brackets. If the platform is fixedly secured directly to the frame, this may, for example, be achieved by welding, riveting, bolting or screwing. Similarly, if the platform is fixedly secured to the frame by means of brackets, this may, for example, be achieved by welding, riveting, bolting or screwing the brackets to both the platform and the frame. In this connection, however, it will be clear that, if welding is to be utilized to fixedly secure the platform directly to the frame or to fixedly secure brackets to one or both of the platform and the frame, then the parts to be welded together must, in fact, be capable of being welded together. For example, it will not be possible to weld a wooden platform either directly to a metal frame or to metal brackets and it will not be possible to weld a wooden frame either directly to a metal platform or to metal brackets.

In one embodiment of the present invention the base of the vehicle comprises an inner rigid metal frame, e.g. an aluminium or steel frame, and a rigid outer skin of a water-impermeable material, e.g. glass fibre reinforced resin. Preferably, a buoyant material, e.g. polyurethane foam, is located within the outer skin of water-impermeable material. The metal frame may, for example, be formed from tubular or sheet metal.

In a further embodiment of the present invention the vehicle comprises an elongate base, one end of which acts as the front of the vehicle and the other end of which acts as the rear of the vehicle. In this embodiment, the mast is preferably pivotally and rotationally mounted at approximately the middle of the elongate base.

Preferably the vehicle according to the present invention comprises two wheels, skis, skates or hydrofoils, with one or both of the wheels, skis, skates or hydrofoils being steerable by appropriate pivotal movement of the mast.

In a particularly preferred embodiment of the present invention the vehicle comprises an elongate base supported on two wheels, skis, skates or hydrofoils, one wheel, ski, skate or hydrofoil being located at each end of the elongate base and one or both of the wheels, skis, skates or hydrofoils being arranged to be steerable, a mast carrying a sail, the mast being pivotally and rotatably mounted on the elongate base for rotational movement about an axis perpendicular to the plane of the elongate base and for pivotal movement with respect to the elongate base, and a mechanism responsive to appropriate pivotal movement of the mast with respect to the elongate base for controlling the or both of said steerable wheels, skis, skates or hydrofoils.

As stated above, the vehicle according to the present invention comprises a mast which carries a sail. However, the vehicle preferably also comprises a hand rail fixedly secured to the mast and to which is attached to sail. The hand rail, which may, for example, be made of metal, e.g. aluminium or steel, wood or a plastics material, is preferably located on both sides of the sail such that a person using the vehicle may be able to stand on the base of the vehicle on either side of the sail and hold the hand rail.

The mast is preferably mounted on the base for both rotational movement about an axis perpendicular to the plane of the base and pivotal movement with respect to the base, thereby allowing the position of the sail relative to the direction of the wind to be adjusted and hence the speed of the vehicle to be controlled.

Preferably a vehicle according to the present invention comprises biassing means adapted to allow the mast, when the mast is not being steerably operated, to remain in a normally perpendicular position relative to an axis which is located in the plane of the base of the vehicle and perpendicular to the longitudinal axis of the base of the vehicle, the biassing means not preventing rotational movement of the mast with respect to the base of the vehicle.

The mechanism, which is responsive to pivotal movement of the mast for controlling the or each of the steerable wheels, skis, skates or hydrofoils may, for example, comprise a fixed shaft, a sleeve located on the shaft and being journalled for rotation about the longitudinal axis of the shaft, the sleeve being connected to the base of the mast, a diametrical through slot located in the shaft, two diametrically opposed, linear, inclined slots located in the sleeve, a steering arm in co-operating engagement with the diametrical through slot in the shaft and the two diametrically opposed, linear, inclined slots in the sleeve such that rotation of the sleeve about the longitudinal axis of the shaft results in pivotal movement of the steering arm in a plane containing the longitudinal axis of the shaft and the longitudinal axis of the steering arm, the pivotal movement of the steering arm controlling the directional movement of the or each of the steerable wheels, skis, skates or hydrofoils.

The means by which the pivotal movement of the steering arm controls the directional movement of the or each of the steerable wheels, skis, skates or hydrofoils may, for example, comprise two flexible steering members, one end of each of the flexible steering members being connected to a respective end of the steering arm and the other end of each of the flexible steering members being connected to a respective side of a steering head connected to a steerable wheel, ski, skate or hydrofoil such that pivotal movement of the steering arm will result in a corresponding pivotal movement of the or each steerable wheel, ski, skate or hydrofoil. The flexible steering members may, for example, comprise wires, cords, strands or threads of material, e.g. string or nylon strands. As an alternative to utilizing flexible steering members, there may, for example, be utilized rods or a crank arrangement.

An alternative mechanism responsive to pivotal movement of the mast for controlling directional movement of the or each of the steerable wheels, skis, skates or hydrofoils may, for example, comprise a bracket attached to the end of the mast adjacent to the base of the vehicle and allowing pivotal movement of the mast in the direction of the longitudinal axis of the base of the vehicle, resilient material, e.g. rubber material, located between the bracket and a mounting member, the mounting member being rigidly secured to the base of the vehicle and the resilient material allowing pivotal movement of the mast in a plane which is perpendicular to the plane of the base of the vehicle and perpendicular to the longitudinal axis of the base of the vehicle, said pivotal movement of the mast in a plane which is perpendicular to the plane of the base and perpendicular to the longitudinal axis of the base being adapted to control the directional movement of the or each of the steerable wheels, skis, skates or hydrofoils. The control of the directional movement of the or each of the steerable wheels, skis, skates or hydrofoils by pivotal movement of the mast may, for example, be effected by providing means comprising attachment means rigidly secured to the bracket and having ends extending outwardly on either side of the bracket, and two flexible steering members, e.g. wires, cords, strands or threads, one end of each of the flexible steering members being attached to a respective end of the attachment means and the other end of each of the flexible steering members being connected to a respective side of a steering head, the steering head being connected to a steerable wheel, ski, skate or hydrofoil. Alternatively, the control of the directional movement of the or each of the steerable wheels, skis, skates or hydrofoils by pivotal movement of the mast may, for example, be effected by providing means comprising a "T"-shaped member pivotally connected to the mounting member and being adapted such that pivotal movement of the mast in a plane perpendicular to the plane of the base of the vehicle and perpendicular to the longitudinal axis of the base of the vehicle will result in pivotal movement of the head of the "T"-shaped member, and two flexible steering members, e.g. wires, cords, strands or threads, one end of each of said flexible steering members being attached to a respective end of the head of the "T"-shaped member and the other end of each of the flexible steering members being connected to a steering head, the steering head being connected to a steerable wheel, ski, skate or hydrofoil.

The present invention will now be further described with reference to the accompanying drawings, in which:

FIG. 1 is a perspective view of one embodiment of a vehicle according to the present invention in which biassing means for the mast have been omitted for clarity and in which the base is supported on two wheels and comprises a frame having a platform fixedly secured thereto;

FIG. 2 is a perspective view of a portion of the steering mechanism of the vehicle illustrated in FIG. 1;

FIG. 7 is a plan view of a further embodiment of the vehicle according to the present invention with the sail omitted;

FIG. 8 is a perspective view of the steering mechanism utilized in the vehicle illustrated in FIG. 7; and FIG. 9 is a perspective view of part of a further steering mechanism suitable for use in the vehicle according to the present invention.

Figure 5:
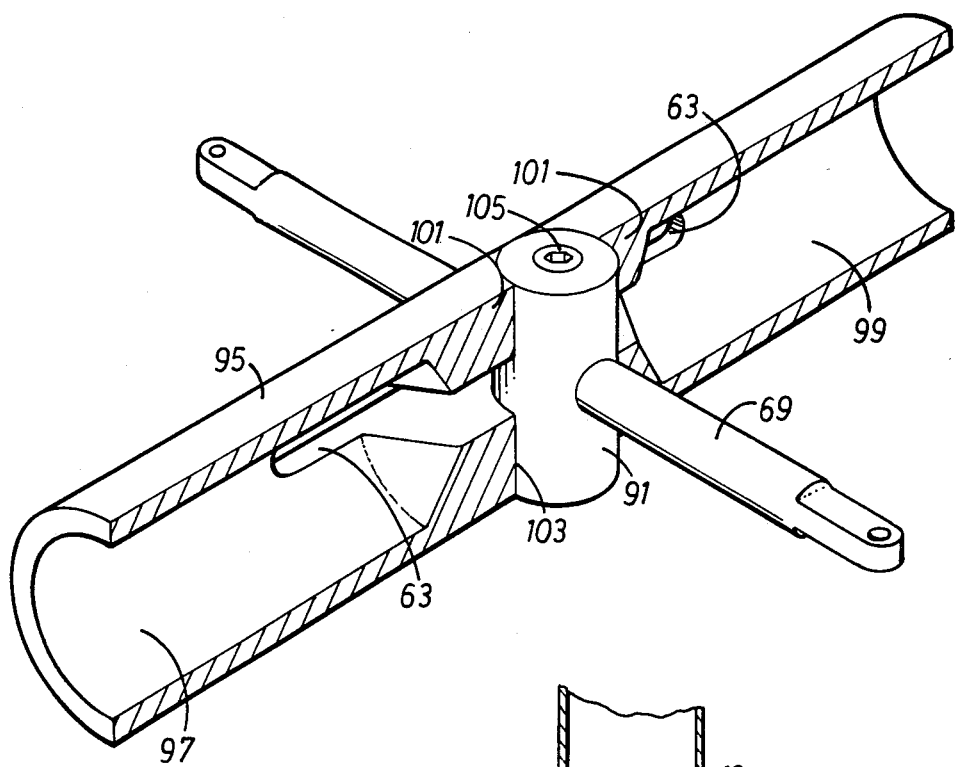
FIG. 5 is a part-sectional view illustrating an alternative means for pivotally mounting the steering arm in the slots in the shaft and sleeve.
Figure 3:
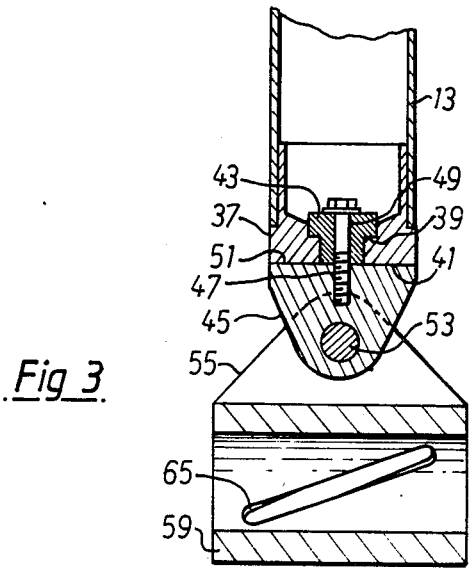
FIG. 3 is a cross-sectional view taken along line I—I in FIG. 1 and illustrating the means by which the mast is pivotally and rotatably mounted with respect to the base.
Figure 4:
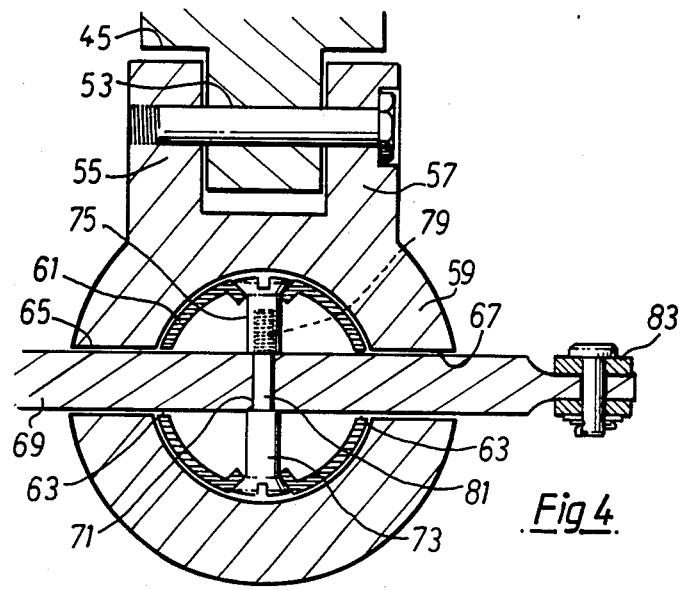
FIG. 4 is a cross-sectional view taken along line II—II in FIG. 1 and illustrating the means by which the steering arm is pivotally mounted in the slots in the shaft and sleeve.

Referring to FIGS. 1 to 4 and 6 of the accompanying drawings, there is illustrated a steerable wind-powered vehicle 1, which is in the form of a land yacht, having a front 3 and a rear 5. The vehicle 1 comprises a base 7 supported on two wheels 9 and 11, a mast 13, a sail 15 and a hand rail 17.

The base 7 comprises a frame 19 having a platform 21 fixedly secured thereto. Frame 19 comprises tubular metal side members 23 and 25 and cross-members 27, 29 and 31. The front end of each of the side members 23 and 25 is fixedly secured to a steering head 33 and the ends of each of the cross members 27, 29 and 31 are fixedly secured to the respective side member 23 or 25. The tubular metal side members 23 and 25, the cross members 27, 29 and 31 and the steering head 33 are preferably made of aluminium or steel. However, cross members 27 and 29 may, for example, alternatively be made of wood or a plastics material, e.g. nylon. The side members 23 and 25 may be fixedly secured to the steering head 33 by any suitable means, for example, by welding, riveting, bolting or screwing. Similarly, the cross members 27, 29 and 31 may be fixedly secured to the side members 23 and 25 by any suitable means, for example, by welding, riveting, bolting or screwing. In this connection, however, it will be clear that, if welding is to be utilised to fixedly secure the side members 23 and 25 to the steering head 33 and/or to fixedly secure any of the cross members 27, 29 or 31 to the side members 23 and 25, then the parts to be welded together must, in fact, be capable of being welded together. For example, it will not be possible to weld cross members 27 and 29 to the tubular metal side members 23 and 25 if the cross members 27 and 29 are made of nylon.

The platform 21 may, for example, be made of metal, wood or a plastics material and may, for example, be fixedly secured directly to the base 7 or be fixedly secured to the base 7 by means of brackets. If the platform 21 is fixedly secured directly to the base 7, this may, for example, be achieved by welding, riveting, screwing or bolting. Similarly, if the platform 21 is fixedly secured to the base 7 by means of brackets, the brackets may, for example, be secured to the platform 21 and base 7 by welding, riveting, bolting or screwing. However, it will be clear that, if welding is to be utilized to fixedly secure the brackets to the platform 21 or to the base 7, then the parts to be welded together must, in fact, be capable of being welded together.

Sail 15 is triangular in shape with one corner thereof being attached to hand rail 17 at 35 and the remaining two corners thereof (only one shown) being attached to the mast 13. Hand rail 17 is located on both sides of the sail 15 such that a person using the vehicle 1 can stand on the platform 21 on either side of the sail 15 and be able to hold the hand rail 17. Further, because the hand rail 17 is fixedly secured to the mast 13, the person using the vehicle 1 can control the position of the mast 13 and sail 15 by appropriate movement of the hand rail 17.

The mast 13 is mounted on the base 7 by means of a mechanism 136 which permits rotational movement with respect to an axis perpendicular to the plane of the base and pivotal and swinging movements with respect to the base 7. The means by which the mast 13 is pivotally and rotatably mounted with respect to the base 7 is more clearly illustrated in FIGS. 2 and 3 and comprises a plug 37, e.g. a nylon plug, fixedly secured to the base of the mast 13. The plug 37 has a central stepped bore 39 and a face 41 which is perpendicular to the longitudinal axis of the mast 13. A stepped bush 43 is rotatably located in the stepped bore 39 and is fixedly secured to a pivot base 45 by means of a bolt 47 passing through a central bore 49 in bush 43 and being screwed into the pivot base 45. This arrangement allows the mast 13 to rotate about an axis perpendicular to the surface 41 of plug 37 and the co-operating surface 51 of pivot base 45. The pivot base 45 is pivotally mounted to a transverse shaft 53 to enable the mast 13 to swing fore and aft. Shaft 53 is fixedly secured to flanges 55 and 57 present on a sleeve 59. Sleeve 59 is journalled for rotation on a longitudinal shaft 61 which is fixedly secured to cross members 27 and 29 to enable the mast to be pivoted laterally with respect to the base 7. The length of sleeve 59 is such that it is a snug fit between cross members 27 and 29 and movement of the sleeve 59 in the longitudinal direction of the shaft 61 is thereby prevented. The pivot base 45, sleeve 59 and shaft 61 may, for example, be made of metal, e.g. aluminium or steel, or a plastics material, e.g. nylon.

Shaft 61, which is in the form of a hollow tube in the illustrated embodiment, but may alternatively be in the form of a solid bar, has a diametrical through slot 63 located therein and sleeve 59 has two diametrically opposed, linear, inclined slots 65 and 67 located therein. In co-operating engagement with the diametric through slot 63 in shaft 61 and the diametrically opposed, linear, inclined slots 65 and 67 in sleeve 59 is a steering arm 69, the steering arm 69 being pivotable about the centre of its length and in a plane containing the longitudinal axis of the shaft 61 and the longitudinal axis of the steering arm 69. To prevent movement of the steering arm 69 in the direction of its longitudinal axis, the steering arm 69 has a central bore 71 through which is located a countersunk head butt screw 73 and a corresponding countersunk head butt socket 75. The countersunk head butt screw 73 has a reduced portion, one end 79 of which is threaded to co-operate with the countersunk head butt socket 75 and the remaining part 81 of which is located in the central bore 71 of steering arm 69.

On either end of the steering arm 69 is a pivotal linkage 83, only one of which is shown in FIGS. 1, 2, 4 and 6. Each pivotal linkage 83 has one end of a respective wire 85 connected thereto, the other end of each wire 85 being connected to a respective pivotal linkage 87. Pivotal linkages 87 are located on either side of fork 89 which is rotatably located in steering head 33 and which carries wheel 9.

In order to steer the vehicle 1 illustrated in FIGS. 1 to 4 and 6 of the accompanying drawings, the base 7 is tilted by the user's feet, whereby the mast 13 is pivoted laterally with respect to the base 7 such that sleeve 59 rotates on shaft 61. This rotational movement of the sleeve 59 results in the steering arm 69 pivoting about its centre, i.e. about the butt screw/socket arrangement 73, 75. Pivotal movement of steering arm 69 results in one of the wires 85 moving in a forward direction and the other of the wires 85 moving in a rearward direction. This movement of the wires 85 causes the fork 89 to pivot and hence to alter the direction of wheel 9.

Figure 6:
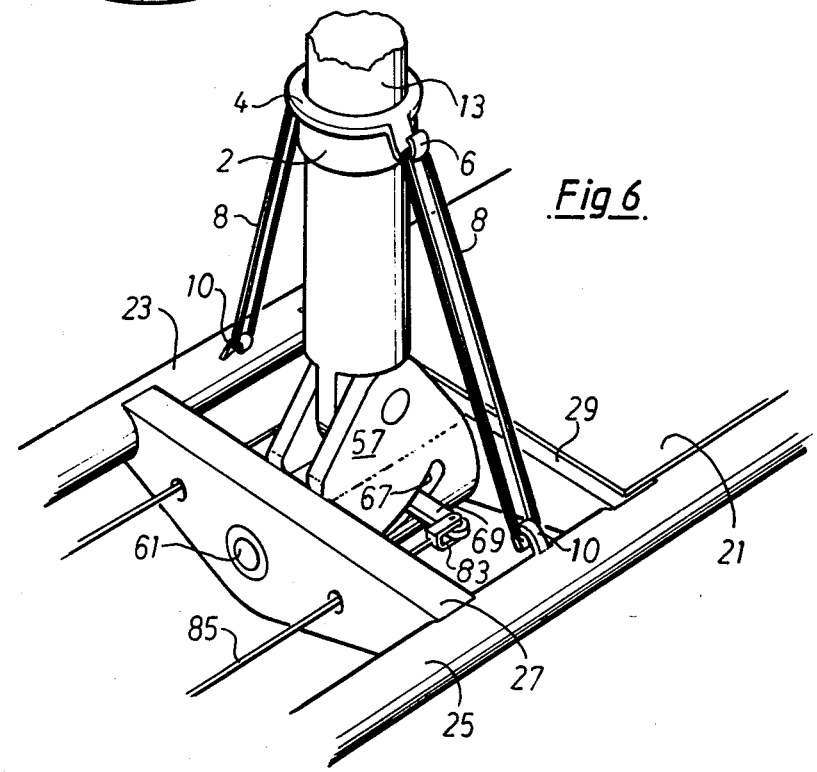
FIG. 6 is a perspective view of biassing means for use with the vehicle illustrated in FIG. 1.

Biassing means are provided, shown only in FIG. 6 for convenience, which bias the mast 13, when the mast is not being steerably operated, perpendicular to the plane of the base 7 and perpendicular to the longitudinal axis of the base 7. The biassing means comprises a bush 2 fixedly secured to the lower part of the mast 13, the bush 2 being freely mounted on ring 4 having two integral attachment hooks 6 (only one shown) which are arranged diametrically opposite each other on the ring 4 and to which are attached respective ends of resilient means 8, such as springs or elastic strips, whose other ends are attached to hooks 10 which are fixedly secured to the base 7.

FIG. 5 illustrates an alternative means for preventing movement of the steering arm 69 in its longitudinal direction and for pivotally mounting the steering arm in the diametrical through slot 63 in shaft 61 and in the diametrically opposed, linear inclined slots 65 and 67 in sleeve 59. In this alternative means the countersunk head butt screw/socket arrangement 73, 75 of FIG. 4 has been replaced by a bush 91, e.g. a nylon bush, which is freely rotatable in a bore 93 of shaft 95. Shaft 95 corresponds to shaft 61 of FIGS. 1, 2, 4 and 6 except that, whereas in the embodiment illustrated in FIGS. 1, 2 4 and 6, the shaft 61 is in the form of a hollow tube having a uniform central bore, in the embodiment illustrated in FIG. 5 shaft 95 is formed by boring a solid bar such that ends 97 and 99 have a hollow tubular structure but the central region of the bar's length is solid. A bore 103 is formed in the central region of the bar, i.e. the region which is not bored when forming the hollow tubular ends 97 and 99, and the diametrical through slot 63 is also formed in the bar.

The bush 91 is secured to the steering arm 69 by means of a socket set screw 105.

FIGS. 7 and 8 of the accompanying drawings illustrate an alternative embodiment of vehicle according to the present invention.

In the embodiment of FIGS. 7 and 8 the vehicle 107 comprises a base 109 supported on two wheels 110a and 110b. The vehicle also comprises a mast, a sail and a hand rail which are not illustrated but which may be the same as mast 13, sail 15 and hand rail 17 present in the vehicle illustrated in FIG. 1.

The base 109 comprises an outer skin 111 of, for example, glass fibre reinforced resin or moulded plastics, a filler material 113, such as polyurethane foam and a tubular metal base member 115 constructed as frame 19 in the embodiment illustrated in FIG. 1. Tubular metal base member 115 may be replaced by a metal base member comprising metal strips instead of tubular members.

The metal base member 115 may, for example, be made of aluminium or steel.

The tubular metal base member 115 has a front end 117 and a rear end 119. The outer skin 111 acts as a platform which covers a substantial part of the base member 115 and which is fixedly secured thereto by suitable means. The front end 117 of the base member 115 has a steering head 121 fixedly secured thereto.

The mast is mounted on the base 109 for rotational movement with respect to an axis perpendicular to the plane of the base and for pivotal and swinging movements with respect to the base. The means by which rotational movement of the mast with respect to the base and for and aft swinging movement of the mast in the longitudinal direction of the base is achieved is the same as described above for the embodiment of FIG. 1 with the flanges 55, 57 and the shaft 53 of FIG. 3 replaced by flanges 123, 125 and shaft 127 in the embodiment of FIG. 8.

The means by which steering is effected in the vehicle 107 is illustrated in FIGS. 7 and 8. Steering mechanism 129 is rigidly fixed into the base 109 of the vehicle 107 by fastening metal side plates 131 of the steering mechanism 129 to the cross members 133, 135 of base member 107 by means of bolts (not shown).

The steering mechanism 129 comprises a metal plate 137 having side flanges 139 which are bolted to sides 123, 125 of a U-shaped member 143. The base 145 of the U-shaped member 143 is bolted to the base 147 of the metal plate 137 by means of bolts 149 which pass through moulded, resilient, ring-shaped members 151 and flanges 153 of a metal mounting 155 as shown in FIG. 7.

Sides 123, 125 of U-shaped member 143 have attachment means 157 welded thereto which act as fixing means for one end of flexible steering members 159, such as ropes or wires, whose other ends are attached to the steering head 121 for steering. The flexible steering members 159 pass around pulleys 161 which are securely fixed to the metal mounting 155 by means of a bracket 156 as shown in FIG. 7.

Ring-shaped members 151 obviate the need for a separate biassing arrangement which is necessary in the embodiment of FIGS. 1 to 6 to hold the mast perpendicular to an axis which is in the plane of the base and perpendicular to the longitudinal axis of the base 109 when not being steerably operated and allows lateral movement of the mast when it is being steerably operated.

Pivotal movement of the mast laterally with respect to the base and in a plane perpendicular to, and transverse to the longitudinal direction of the base 109, raises one of attachment means 157 and lowers the other of attachment means 157. Raising of one of the attachment means 157 pulls the respective flexible steering member 159 which pulls that side of the steering head 121 to which it is attached and allows the steering head 121 to pivot.

Both flexible steering members 159 remain substantially taut at all times since any slack in one of such members 159, caused by lowering of a respective attachment means, is immediately taken up by pivotal movement of steering head 121, this pivotal movement being due to the pull exerted by the other of said flexible steering members 159 when its respective attachment means is raised. It will be appreciated that a crank mechanism may be used instead of the attachment means 157 and pulleys 161 described above.

In order to accommodate extreme lateral movement of the mast, U-shaped member 143 has a slot 144 extending through its base 145 and partly up its flange 123, 125. This slot 144 accommodates the flexible steering members 159 which would otherwise be pushed outwards by U-shaped member 143 during extreme lateral movement of the mast.

FIG. 9 shows a further steering mechanism 163 suitable for use with a vehicle of the present invention. This is rigidly fixed to the base of the vehicle, e.g. to base 109 of the vehicle 107 illustrated in FIG. 7 by fastening, e.g. by means of bolts, a metal mounting member 165 to the base of the vehicle, e.g. to the cross members 133, 135 of the vehicle illustrated in FIG. 7.

The steering mechanism 163 comprises a top horizontal metal plate 167, having flanges 169, 171, for pivotally attaching the mast thereto. A first resilient member 173, a metal mounting 167 and a second resilient member 177, plate 167, resilient member 173, side 175 of metal mounting 167, resilient member 177, and a further metal plate 179 are all bolted together by means of bolts 181.

The metal plate 179 has two flanges 183, the flanges 183 being located on opposite sides of the metal plate 179. Pivotally attached to flanges 183 is a T-shaped member 185. The ends of the head 187 of the T-shaped member 185 are pivotally attached to respective flanges 183 such that the T-shaped member 185 is free to rotate about its head 187. A second T-shaped member 189 is attached to the base of the "T" of the T-shaped member 185 by means of a ball and socket swivel joint 195. Ends 197 of T-shaped member 185, one of which is shown, have holes 199 therein which are used to accommodate one end of flexible steering members such as the flexible steering members 159 of FIG. 8.

Again, the resilient members 173, 177 obviate the need for a separate biassing arrangement and allow pivotal movement of the mast.

Lateral movement of the mast causes the steering mechanism 163 to tilt in the direction of arrow A. This causes the ball and socket arrangement to move in the direction of arrow B resulting in the end 197, shown in FIG. 9, of T-shaped member 189 moving in the direction of arrow C. The other end 197 of T-shaped member 189 will move in a direction opposite that of arrow C. As described for the previous embodiments, this movement controls the flexible steering members 159 which steer the vehicle 107.

I claim:

1. A steerable wind-powered vehicle, which comprises:
   (a) an elongate base having a longitudinal axis;
   (b) first and second carrier means selected from the group consisting of wheels, skis, skates and hydrofoils, said first carrier means being located at one end of said base and the second carrier means being located at the other end of said base to support said base,
   wherein a point of the first carrier means and a point of the second carrier means are substantially collinear with the axis of the base, at least one of said carrier means being arranged to be steerable;
   (c) a mast carrying a sail;
   (d) means pivotally mounting said mast on said base; and
   (e) a mechanism responsive to lateral pivotal movement of said mast relative to said base for controlling directional movement of said steerable carrier means.

2. A vehicle according to claim 1, in which the base comprises a rigid frame having a platform fixedly secured thereto.

3. A vehicle according to claim 2, in which the rigid frame is a rigid metal frame.

4. A vehicle according to claim 3, in which the metal is selected from aluminium and steel.

5. A vehicle according to claim 1, in which the base comprises an inner rigid metal frame and a rigid outer skin of a water-impermeable material.

6. A vehicle according to claim 5, in which the inner rigid metal frame is selected from aluminium and steel.

7. A vehicle according to claim 5, in which the water-impermeable material of the rigid outer skin is glass-fiber reinforced resin.

8. A vehicle according to claim 5, in which a buoyant material is located within the rigid outer skin of the base.

9. A vehicle according to claim 8, in which the buoyant material is polyurethane foam.

10. A vehicle according to claim 1, in which said two carrier means comprise two wheels.

11. A vehicle according to claim 1, which also comprises biassing means adapted to allow the mast, when the mast is not being steerably operated, to remain in a normally perpendicular position relative to an axis which is located in the plane of the base and perpendicular to the longitudinal axis of the base.

12. A vehicle according to claim 11, in which the biassing means is selected from resilient material and springs attached to both the mast and the base.

13. A vehicle according to claim 12, in which the resilient material is a rubber material.

14. A vehicle according to claim 1, in which the mechanism responsive to pivotal movement of the mast for controlling directional movement of said at least one of said carrier means comprises a fixed shaft, a sleeve located on the shaft and being journalled for rotation about the longitudinal axis of the shaft, the sleeve being connected to the base of the mast, a diametrical through slot located in the shaft, two diametrically opposed, linear, inclined slots located in the sleeve, a steering arm in co-operating engagement with the diametrical through slot in the shaft and the two diametrically opposed, linear, inclined slots in the sleeve such that rotation of the sleeve about the longitudinal axis of the shaft results in a pivotal movement of the steering arm in a plane containing the longitudinal axis of the shaft and the longitudinal axis of the steering arm, the pivotal movement of the steering arm being adapted to control the directional movement of said at least one of said carrier means.

15. A vehicle according to claim 14, in which control of the directional movement of said at least one of said carrier means by pivotal movement of the steering arm is effected by providing means comprising two flexible steering members, one end of each of the flexible steering members being connected to a respective end of the steering arm and the other end of each of the flexible steering members being connected to a respective side of a steering head, said steering head being connected to a steerable carrier means.

16. A vehicle according to claim 15, in which the flexible steering members are selected from wires, cords, strands and threads of material.

17. A vehicle according to claim 1, in which the mechanism responsive to pivotal movement of the mast for controlling directional movement of said at least one of said carrier means comprises a bracket attached to the end of the mast adjacent to the base of the vehicle and allowing pivotal movement of the mast in the direction of the longitudinal axis of the base of the vehicle, resilient material located between said bracket and a mounting member, said mounting member being rigidly secured to the base of the vehicle and said resilient material allowing pivotal movement of the mast in a plane which is perpendicular to the plane of the base of the vehicle and perpendicular to the longitudinal axis of the base of the vehicle, said pivotal movement of the mast in a plane which is perpendicular to the plane of the base and perpendicular to the longitudinal axis of the base being adapted to control the directional movement of said at least one of said carrier means.

18. A vehicle according to claim 17, in which control of the directional movement of said at least one of said carrier means by pivotal movement of the mast is effected by providing means comprising attachment means rigidly secured to said bracket and having ends extending outwardly on either side of said bracket, and two flexible steering members, one end of each of the flexible steering members being attached to a respective end of said attachment means and the other end of each of the flexible steering members being connected to a respective side of a steering head, said steering head being connected to a steerable carrier means.

19. A vehicle according to claim 17, in which the resilient material is a rubber material.

20. A vehicle according to claim 17, in which control of the directional movement of said at least one of said carrier means by pivotal movement of the mast is effected by providing means comprising a "T"-shaped member pivotally connected to said mounting member and being adapted such that pivotal movement of the mast in a plane perpendicular to the plane of the base of the vehicle and perpendicular to the longitudinal axis of the base of the vehicle will result in pivotal movement of the head of the "T"-shaped member, and two flexible steering members being attached to a respective end of the head of the "T"-shaped member and the other end of each of said flexible steering members being connected to a steering head, said steering head being connected to a steerable carrier means.

21. A vehicle according to claim 1, wherein said mounting means pivotally mounts said mast for said lateral pivotal movement relative to the base and for a longitudinal fore and aft swinging movement.

22. A vehicle according to claim 1, wherein said mounting means also rotatably mounts said mast on said base.

* * * * *